May 31, 1927.
J. H. WAGENHORST
VEHICLE WHEEL
Filed Aug. 19, 1921
1,630,875
2 Sheets-Sheet 1
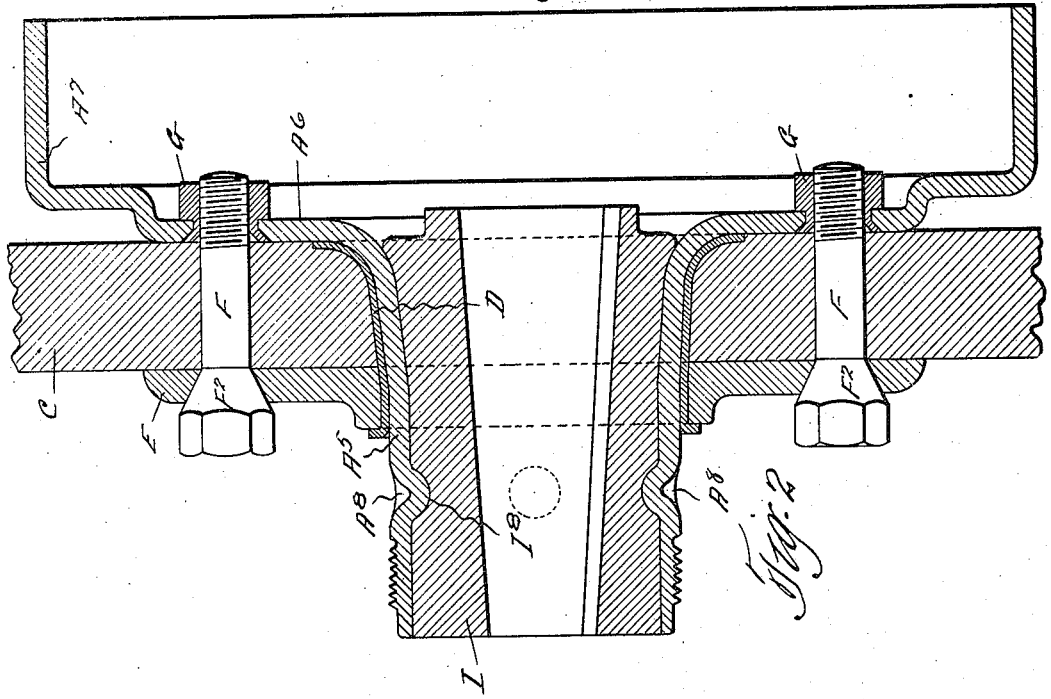
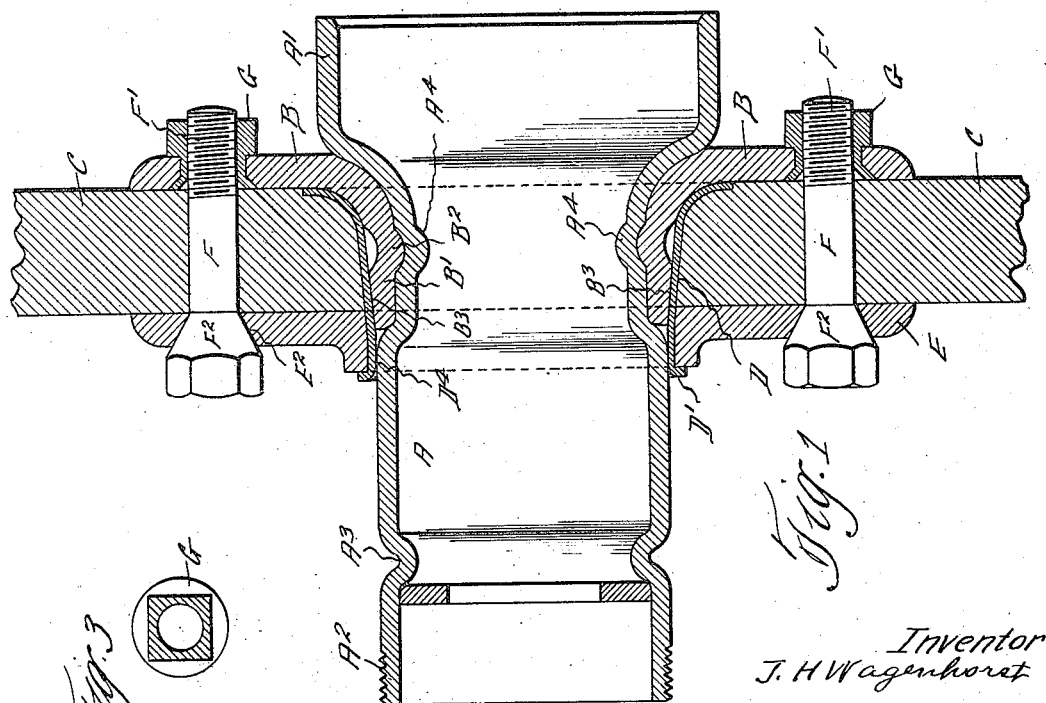
Inventor
J. H Wagenhorst
By Hull Brock & West
Attys.

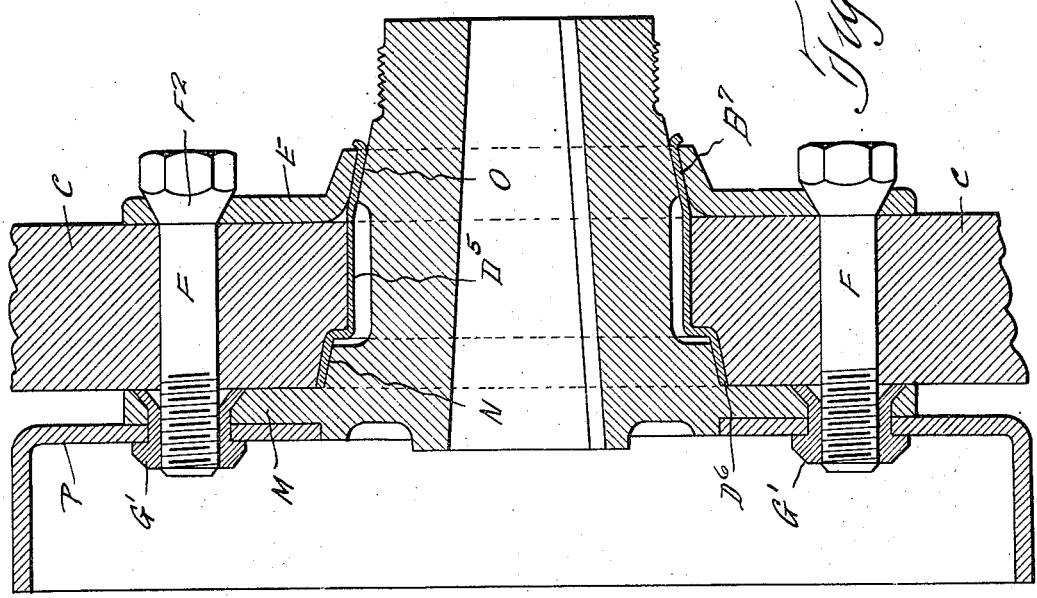
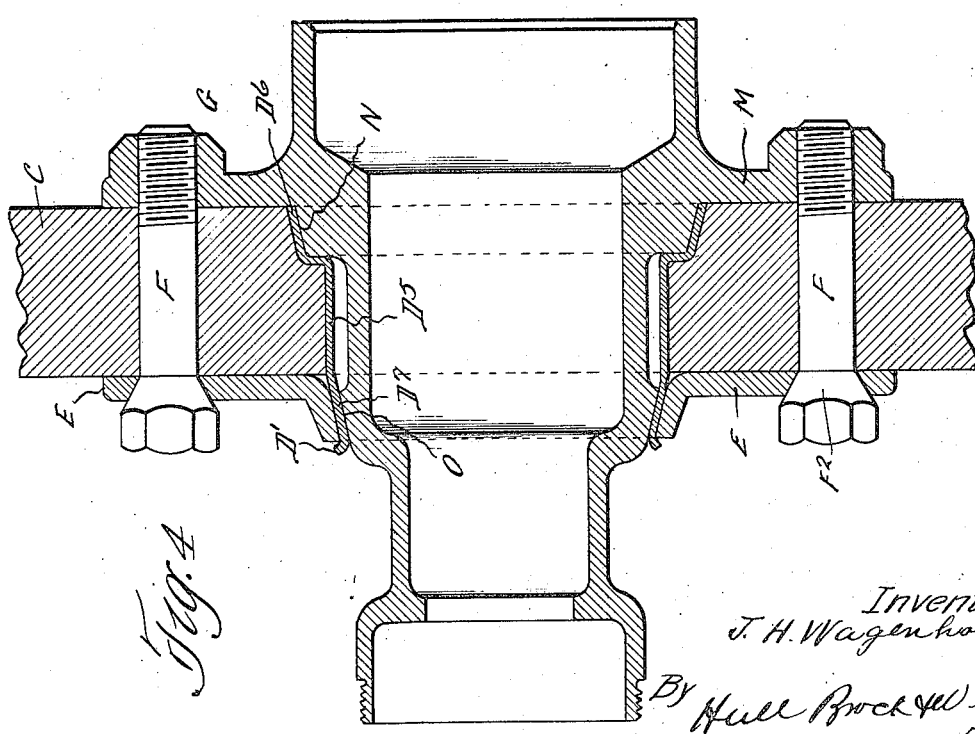

Patented May 31, 1927.                                              1,630,875

UNITED STATES PATENT OFFICE.

JAMES H. WAGENHORST, OF JACKSON, MICHIGAN.

VEHICLE WHEEL.

Application filed August 19, 1921. Serial No. 493,508.

This invention relates generally to demountable wheels and more particularly to the hub structure of said wheels whereby the mounting and demounting of the wheel body is quickly and easily accomplished. Another object of the invention is to provide a novel construction of sheet metal hub which is both simple and economical and at the same time strong and durable.

A still further object is to provide a wheel structure of the demountable type in which the parts are securely connected at the center so that a firm mounting of the wheel body can be had upon the hub structure.

A further object of my invention is to provide simple and effective means for holding a full complement of wooden spokes properly assembled when removed from the hub, so as to permit the demounting of the wheel body from the hub and its subsequent mounting thereon.

With these various objects in view the invention consists in the novel features of construction hereinafter fully described and set forth in the appended claims. In the drawings forming a part of this specification Fig. 1 is a sectional view of a sheet metal hub with a demountable wheel body applied thereto, this view showing the front hub and wheel; Fig. 2 is a similar view showing the rear hub and wheel; Fig. 3 is a sectional plan view of the nut G; Fig. 4 is a view showing a slight modification of the front wheel structure and a forced or molded hub; and Fig. 5 is a similar view showing the rear hub and wheel structure.

Referring to Fig. 1, A indicates the sheet metal barrel or shell of the front hub, being expanded or enlarged as shown at $A'$ at the inner end and threaded externally at the outer end as indicated at $A^2$ to receive a hub cap thereon. This shell is pressed inwardly as indicated at $A^3$ to provide an interior shoulder against which the bearing parts may contact. The barrel or shell A has a rear hub flange B rigidly connected thereto, this flange being of sheet metal and having an outwardly projecting portion $B'$ which is pressed inwardly as shown at $B^2$ to fit into a corresponding depression $A^4$ produced in the barrel or sleeve of the hub. In practice I prefer to slightly contract the barrel or sleeve as shown and have the outwardly projecting portion $B'$ of the hub flange fit snugly thereinto and by means of the depression $B^2$ fitting into the corresponding depression $A^4$ the hub flange and barrel are rigidly connected, one to the other; and the proper bearing surface for the wheel body is provided. The spokes C are mitered at their inner ends in the usual manner and are provided at their extreme inner ends with a sheet metal band D which is turned into firm contact with the ends of the spokes which are tapered inwardly as shown, and the extreme outer edge of this band D is rolled over the edge of the outer hub flange E as most clearly shown at $D'$, thus firmly connecting the inner ends of the spokes and the outer hub flange together. When the wheel is mounted upon the hub, the metal band D is brought into intimate contact with the hub flange B and its outwardly projecting portion $B'$ and it will be noted that the inclined band D engages the beveled face $B^3$ of the outwardly projecting portion of the hub flange. It will also be noted that the metal band D contacts with and rides upon the barrel or shell of the hub at the point $D^4$, thereby giving the wheel body a firm contact with the hub structure and placing the metal parts in contact with each other and maintaining the spoke ends firmly locked together.

Flange bolts F are passed through the outer hub flange E and through the spokes, and their threaded ends $F'$ engage the nuts G which are fixedly connected to the inner hub flange B; or they may be made an integral part of said flange if desired as shown in Fig. 4. The heads of the flange bolts are made tapering or conical as shown at $F^2$ and the outer hub flange is provided with counterbored openings $E^2$ to receive the same so that when the flange bolts are securely tightened the conical head $F^2$ will engage the corresponding seat in the outer hub flange and securely lock all of the parts together.

In Fig. 2, I have shown the barrel or shell of the hub $A^5$ formed with the integral hub flange $A^6$ and the brake drum $A^7$ an integral part of said flange. The spokes C have the sheet metal band D applied to the inner ends thereof in the manner previously described, and the outer hub flange E is also connected in the same manner, and flange bolts F are employed engaging nuts G which are fixedly connected to the flange $A^6$; or if desired, may be an integral part thereof, as shown in Fig. 4. The barrel or shell is provided with the forged or cast skein portion I and this is rigidly secured in place by depressing the barrel or shell at points A⁸ and pressing the same into corresponding depressions I⁸ in the skein. The metallic band D fits snugly upon the tapered portion of the barrel or shell and flange and when properly arranged upon the hub and the bolts applied and secured, brings the said band into firm and locked relation with the hub structure.

In Figs. 4 and 5 I have shown cast or forged metal hubs, the interiors of which are of standard construction. Upon the exterior they are provided with an integral inner hub flange M and they are also formed with spaced exterior bearing surfaces N and O, which in the present instance are shown tapered or inclined. The spokes C have their inner ends connected by means of a sheet metal band D⁵ having one portion D⁶ for contact with the surface N and the other portion D⁷ for contact with the surface O and the extreme outer end D' is turned back to engage the edge of the outer hub flange E as previously described. The hub bolts F, such as already described, are employed in connection with nuts G which are rigidly connected to the rear hub flange and are preferably integral therewith. A brake drum P is also rigidly connected to the hub flange M and the nut G' may serve the double purpose of connecting the brake drum to the hub flange and also providing the nut for the flange bolt F. By the employment of the metal bands D connected as described to the inner ends of the spokes, positive accurate contacts of metal against metal can be obtained and by means of the flange bolts the contacting surfaces can be drawn into firm contact with each other and it will also be noted that only a slight change in the construction of the inner end of the spoke is necessary, that is, the extreme inner edge thereof being rounded off as shown in Figs. 3 and 4. By having the metallic bands D embrace the outer hub flange in the manner indicated a rigid wheel structure is provided at the center and at the same time a broad bearing is provided between the wheel structure and the hub structure.

It will thus be seen that I provide a novel construction of demountable wheel and hub structure usable in connection therewith, which hub structure can be of pressed sheet metal or forged or cast, as preferred.

Having thus described my invention, what I claim is:

1. In a wheel the combination of an inner hub having an external bearing surface and a radially extending flange at the rear thereof, a set of spokes, a sheet metal liner sleeve engaging the inner ends of said spokes and shaped to fit the bearing surface of the hub, a front flange removably mounted on the hub and engaging the front surfaces of the spokes and a plurality of bolts passing through the front flange and the spoke set and screwing into said hub flange said front flange and liner sleeve being connected whereby the liner sleeve and front flange hold the spokes in assembled relation upon the removal of the bolts to permit the demounting of the wheel.

2. The combination with a hub having a rear flange and an inclined external bearing surface adapted to support a wheel body, of a set of spokes having sloping inner ends, a front hub flange engaging the spokes, means for connecting said spokes and front flange to the hub, and a liner sleeve shaped to conform to the inner ends of said spokes and to the external bearing surface of the hub, said liner sleeve having its front edge flanged outwardly against the front flange to maintain the said flange and spokes in assembled relation independently of the hub and connecting means.

3. The combination with a hub having a rear flange and a removable front flange, said hub having spaced tapered bearing surfaces of different diameters, a wheel body comprising a complement of spokes and a liner sleeve inserted in the central opening of said wheel body and conforming to the inner ends of said spokes, said sleeve being flanged outwardly in front of the front hub flange, and bolts extending through said front flange and spokes and connecting said wheel body to the hub.

In testimony whereof, I hereunto affix my signature.

JAMES H. WAGENHORST.